United States Patent
Li (10) Patent No.: US 9,983,963 B2
(45) Date of Patent: May 29, 2018

(54) SYSTEM AND METHOD FOR EXPLOITING HARD DISK DRIVE CAPACITY RESERVE AND EXTENDING OPERATING LIFE THEREOF

(71) Applicant: Alibaba Group Holding Limited, Grand Cayman (KY)

(72) Inventor: Shu Li, Santa Clara, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 85 days.

(21) Appl. No.: 14/936,355

(22) Filed: Nov. 9, 2015

(65) Prior Publication Data
US 2017/0132099 A1 May 11, 2017

(51) Int. Cl.
*G06F 11/20* (2006.01)

(52) U.S. Cl.
CPC .... *G06F 11/2094* (2013.01); *G06F 2201/805* (2013.01); *G06F 2201/85* (2013.01)

(58) Field of Classification Search
CPC ............. G06F 11/1076; G06F 11/2056; G06F 11/2094
USPC ................................ 714/6.13, 6.22
See application file for complete search history.

(56) References Cited

U.S. PATENT DOCUMENTS

| | | | |
|---|---|---|---|
| 4,914,530 A | 4/1990 | Graham et al. | |
| 5,235,585 A | 8/1993 | Bish et al. | |
| 5,822,142 A | 10/1998 | Hicken | |
| 5,937,435 A | 8/1999 | Dobbek et al. | |
| 5,941,998 A | 8/1999 | Tillson | |
| 6,034,831 A * | 3/2000 | Dobbek | G11B 19/04 360/31 |
| 6,101,619 A | 8/2000 | Shin | |
| 6,118,608 A | 9/2000 | Kakihara et al. | |
| 6,201,655 B1 | 3/2001 | Watanabe et al. | |
| 6,239,931 B1 | 5/2001 | Chung et al. | |
| 6,247,152 B1 | 6/2001 | Russell | |
| 6,327,679 B1 | 12/2001 | Russell | |
| 6,332,204 B1 | 12/2001 | Russell | |
| 6,421,747 B1 | 7/2002 | Wilson | |
| 6,427,215 B2 | 7/2002 | Rafanello et al. | |
| 6,526,476 B2 | 2/2003 | Wilson et al. | |
| 6,574,699 B1 | 6/2003 | Dobbek | |
| 6,654,193 B1 | 11/2003 | Thelin | |
| 6,826,778 B2 * | 11/2004 | Bopardikar | G06F 11/1092 348/E11.021 |
| 7,027,241 B2 | 4/2006 | Chu et al. | |
| 7,051,154 B1 | 5/2006 | Chng et al. | |
| 7,076,604 B1 | 7/2006 | Thelin | |
| 7,120,737 B1 * | 10/2006 | Thelin | G11B 20/1816 360/55 |
| 7,281,156 B1 | 10/2007 | Leneman | |

(Continued)

*Primary Examiner* — Elmira Mehrmanesh (57) ABSTRACT

A method of accessing data stored in a storage disk of a storage system includes the steps of receiving a read operation to a sector of the storage disk and in response to an error returned from the read operation, determining whether the sector is to be replaced. If the sector is determined to be replaced, the method further includes replacing the sector with a spare sector. The data previously stored at the replaced disk sector are reconstructed and written to the spare sector, and the LBA assigned to the replaced sector is reassigned to the PBA associated with the spare sector.

15 Claims, 7 Drawing Sheets

(56) References Cited

U.S. PATENT DOCUMENTS

| | | | |
|---|---|---|---|
| 7,610,506 B2 * | 10/2009 | Arai | G06F 11/1084 |
| | | | 714/6.12 |
| 7,644,304 B2 | 1/2010 | Kotzur et al. | |
| 7,661,020 B1 | 2/2010 | Coatney | |
| 7,694,173 B1 * | 4/2010 | Schoenthal | G06F 3/0607 |
| | | | 711/161 |
| 7,719,939 B2 | 5/2010 | Akahoshi et al. | |
| 8,015,433 B2 | 9/2011 | Chu et al. | |
| 8,565,053 B1 | 10/2013 | Chung | |
| 8,654,619 B1 | 2/2014 | Cheng | |
| 8,694,814 B1 | 4/2014 | Salomon et al. | |
| 8,694,841 B1 | 4/2014 | Chung et al. | |
| 8,786,972 B2 | 7/2014 | Grobis et al. | |
| 8,867,153 B1 | 10/2014 | Coker et al. | |
| 8,941,943 B1 | 1/2015 | Coker et al. | |
| 9,104,549 B2 * | 8/2015 | Cheng | G06F 12/0246 |
| 2001/0010085 A1 | 7/2001 | Rafanello et al. | |
| 2005/0149827 A1 | 7/2005 | Lambert et al. | |
| 2008/0279073 A1 | 11/2008 | Gotoh et al. | |
| 2009/0055681 A1 * | 2/2009 | Dholakia | G06F 11/1076 |
| | | | 714/6.13 |
| 2011/0022793 A1 | 1/2011 | Gaspard | |
| 2011/0041005 A1 | 2/2011 | Selinger | |
| 2011/0271043 A1 * | 11/2011 | Segal | G06F 12/0246 |
| | | | 711/103 |
| 2013/0061019 A1 * | 3/2013 | Fitzpatrick | G06F 11/3485 |
| | | | 711/173 |
| 2014/0157089 A1 * | 6/2014 | Dave | G06F 11/1068 |
| | | | 714/773 |
| 2014/0189280 A1 | 7/2014 | Salomon et al. | |
| 2014/0304486 A1 | 10/2014 | Grube et al. | |
| 2014/0310494 A1 * | 10/2014 | Higgins | G11C 16/349 |
| | | | 711/167 |
| 2015/0120928 A1 * | 4/2015 | Gummaraju | H04L 67/1008 |
| | | | 709/226 |

* cited by examiner

SYSTEM AND METHOD FOR EXPLOITING HARD DISK DRIVE CAPACITY RESERVE AND EXTENDING OPERATING LIFE THEREOF

TECHNICAL FIELD

The present invention relates generally to data storage systems, and more particularly to data storage of hard disk drives (HDDs) utilizing reserved capacity thereof and providing for extended operating life thereof.

BACKGROUND

Data centers constantly face the ever-proliferating demand of data storage. Hard disks are one of the primary storage media utilized by data centers. However, hard disks are susceptible to a high annual fault rate (AFR) which leads to a considerable amount of volume non-utilized or under-utilized. Conditions such as reaching system capacity, mechanical wear and degradation, as well as disk failure all contribute to the faulting states of HDDs.

Figure 1:
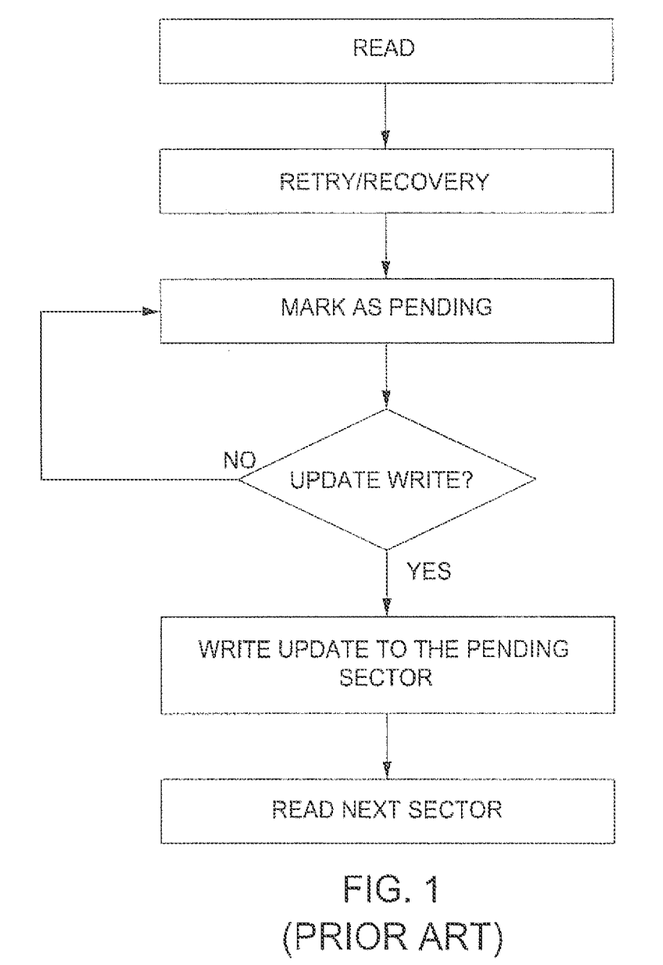
FIG. 1 is a flow chart of a process for pending disk sector management of a data storage system of the prior art.

One of the causing factors of disk failure is the medium error, which occurs when a disk sector cannot be read. One solution a storage system utilizes to address sector errors is to deploy a pending sector procedure, as shown in FIG. 1, where in response to a failure to read, the storage system marks the disk sector as pending sector after an number of unsuccessful retires and attempts to rectify the errors through internal recovering mechanisms. Given a pending status, upon a write operation to the particular pending disk sector, the storage system replaces the content of the pending disk sector with the content of the write operation. Subsequently, the data written to the pending disk sector is read for verification. Upon a verified write operation, the pending disk sector will be cleared of the pending status and become a normal functioning sector. The storage system also keeps a count of the pending disk sectors and in the event the count becomes greater than a pre-determined threshold, the storage system will mark the unreliable disk drive as a failed disk drive.

However, presently the pending sector procedure as described above is only initiated upon write operations to the pending sector. In other words, absent a data write event to the disk sector marked as pending, for example, when the storage system is servicing read intensive applications for an extended period of time, a problematic sector will never be rewritten and rectified as normal sector. Such a sector remains pending to the possible extent that the entire disk drive is marked as inaccessible due to a large number of sectors accumulated as pending in this fashion.

Therefore, there exists a need to effectively rectify a pending disk sector towards higher degree of disk reliability, fuller disk capacity usage and extended disk operating life.

SUMMARY

According to one exemplary embodiment of the present disclosure, a method of accessing data stored in a storage disk of a storage system includes the steps of receiving a read operation to a sector of the storage disk and in response to an error returned from the read operation, determining whether the sector is to be replaced. If the sector is determined to be replaced, the method further includes replacing the sector with a spare sector, and reconstructing the data previously stored at the sector such that the reconstructed data is written to the spare sector.

According to another exemplary embodiment of the present disclosure, a storage system includes a storage disk, a processor; and a non-transitory computer-readable medium operably coupled to the processor, the non-transitory computer-readable medium having computer-readable instructions stored thereon to be executed when accessed by the processor. The instructions include receiving a read operation to a sector of the storage disk, and in response to an error returned from the read operation, determining whether the sector is to be replaced. If the sector is to be replaced, the instructions further include replacing the sector with a spare and reconstructing the data previously stored at the sector such that the reconstructed data is written to the spare sector.

According to yet another exemplary embodiment of the present disclosure, non-transitory computer readable storage medium having embedded therein program instructions, when executed by one or more processors of a device, causes the device to execute a process for accessing data of a storage disk. The process includes receiving a read operation to a sector of the storage disk, and in response to an error returned from the read operation, determining whether the sector is to be replaced. If the sector is to be replaced, the process further includes replacing the sector with a spare and reconstructing the data previously stored at the sector such that the reconstructed data is written to the spare sector.

The details of one or more embodiments of the disclosure are set forth in the accompanying drawings and the description below. Other features, objects, and advantages of the disclosure will be apparent from the description and drawings, and from the claims.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 2-7. However, those skilled in the art will readily appreciate that the detailed description given herein with respect to these figures is for explanatory purposes as the disclosure extends beyond these limited embodiments.

Figure 2:
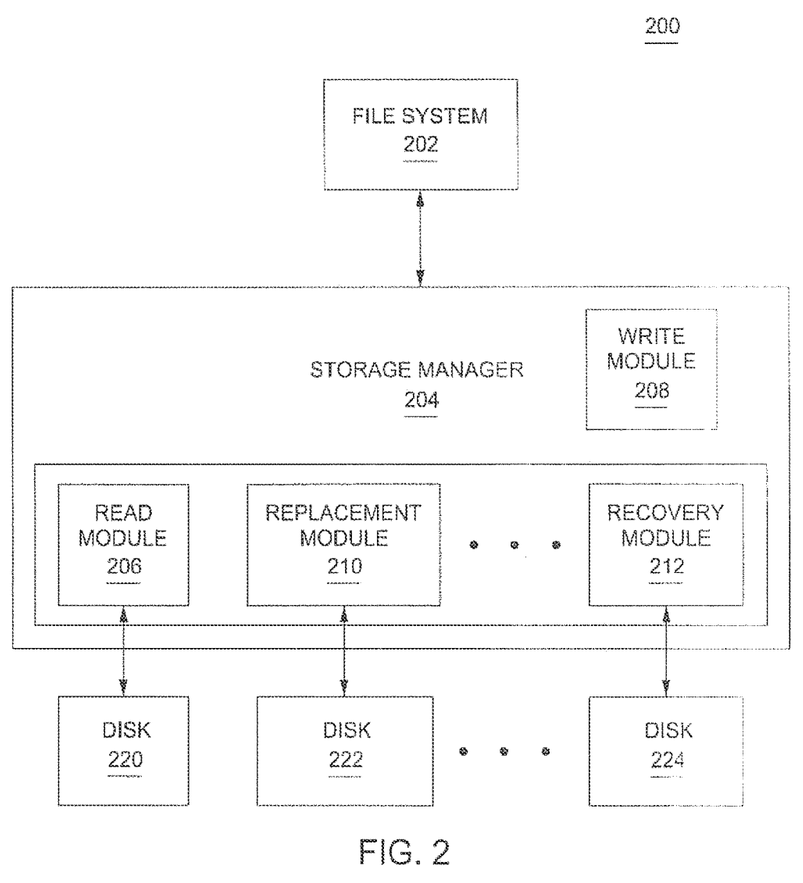
FIG. 2 is a schematic block diagram of an exemplary storage system in accordance with an embodiment of the present disclosure.

Referring to FIG. 2, a schematic block diagram of an exemplary storage system is shown in accordance with an embodiment of the present disclosure. System 200 includes file system 202 communicatively coupled to storage manager 204, which communicatively coupled to a plurality of disks 220, 222, 224. File system 202 provides a data access interface to a variety of clients such as the operating system or the backup system of a server, personal computer, mobile devices in communication with the storage system locally or over a network. File system 202 processes data accessing requests from clients to storage manager 204, which in turn communicates through read module 206 and write module 208 to dispatch read operations and write operations respectively to disks 220, 222, and 224.

Storage manager 204 can optionally include a RAID manager (not shown) in systems where disks 220-224 are implemented as RAID arrays of disks instead of individual disks. With a RAID configuration, RAID manager is responsible for transforming the data access requests from file system 202 into disk logical block requests for storage manager 204 to access the corresponding physical blocks in any of disks 220-224.

In some embodiments, storage manager 204 includes replacement module 210 and a content recovery module 212. Replacement module 210 is configured for, in the event of an error returned in response to a read operation, without awaiting for a write operation to the error generating disk sector, performing a replacement process which replaces the unstable disk sector with a spare sector such that the pending status accorded to the unstable erring sector is corrected. Content recovery module 212 is responsible for reconstructing the content that is previously stored at the unstable sector upon a recovery request received from replacement module 210, which writes the reconstructed data for the unstable sector to the spare sector in turn. The write operation to the spare sector can be further verified to ensure the success of the replacement operation.

Content recovery module 212 recovers content for an unstable sector utilizing a variety of implementations. In some embodiments, content recovery module 212 is configured to obtain a duplicate copy stored a backup storage system. In some alternative embodiments where the unstable disk is amongst an array of RAID disks, content recovery module 212 can be configured to recover the data from RAID disks other than the unstable disk. In some other alternative embodiments where disks are configured using the erasure coding scheme for error correction, content recovery module 212 can be configured to recover the data by the process of erasure decoding across the plurality of erasure coding protected disks.

For example, erasure coding and decoding can be implemented using Reed-Solomon codes, where a n-bit codeword having k-bit user portion and m-bit parity portion (n=m+k), are encoded with Reed-Solomon code for a HDD channel. In this configuration, in the event of a sector generating a read error, the application of the erasure decoding can correct m bits that have incurred error. In particular, a system of k+m HDDs can be deployed to store data in k HDDs while m HDDs are allocated for storing parity data. Thus, the HDD system can correct at most m erring HDDs from the k+m HDDs in the system.

Figure 3:
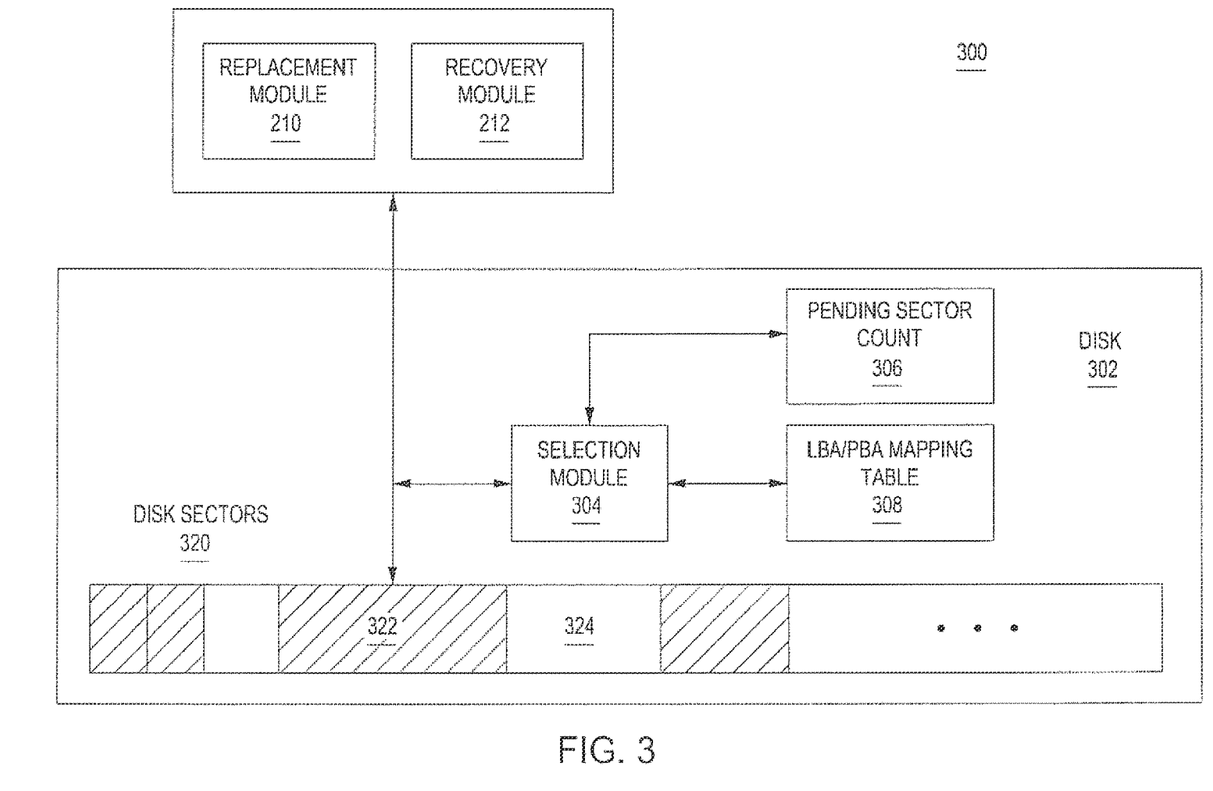
FIG. 3 is schematic block diagram illustrating an exemplary pending disk sector replacement mechanism in accordance with an embodiment of the present disclosure.

Referring to FIG. 3, a schematic block diagram illustrating an exemplary pending disk sector replacement mechanism for a storage system is shown in accordance with an embodiment of the present disclosure. System 300 is illustrated as part of system 200, including replacement module 210 and content recovery module 212. Replacement module 210 is configured to manage pending related replacement for all sectors 320 of disk 302, including the in-use sectors 322 which are depicted in shadow and not-in-use sectors 324 which are not in shadow. The disk 302 can present any of disks 220-224 or storage units of FIG. 2.

In some embodiments, for each sector, in response to an error in a read operation, replacement module 210 also sends a request to selection module 304 as part of control of disk 302 to identify and allocate a spare sector which can be utilized to replace the pending sector that has generated the read error. Upon a successful allocation of a spare sector, the PBA for the newly allocated spare sector is assigned to the LBA associated with the pending sector and the LBA/PBA mapping table 308 is updated accordingly to reflect the new mapping relationship. Further, the pending sector count 306 will be also be adjusted to reflect the fact that the pending disk sector is no long in the pending status and replaced with its content written to a spare sector. Replacement module 210 performs the process above described iteratively for each of the sectors 320 of disk 302 in response to a sector incurring a read error.

Figure 4:
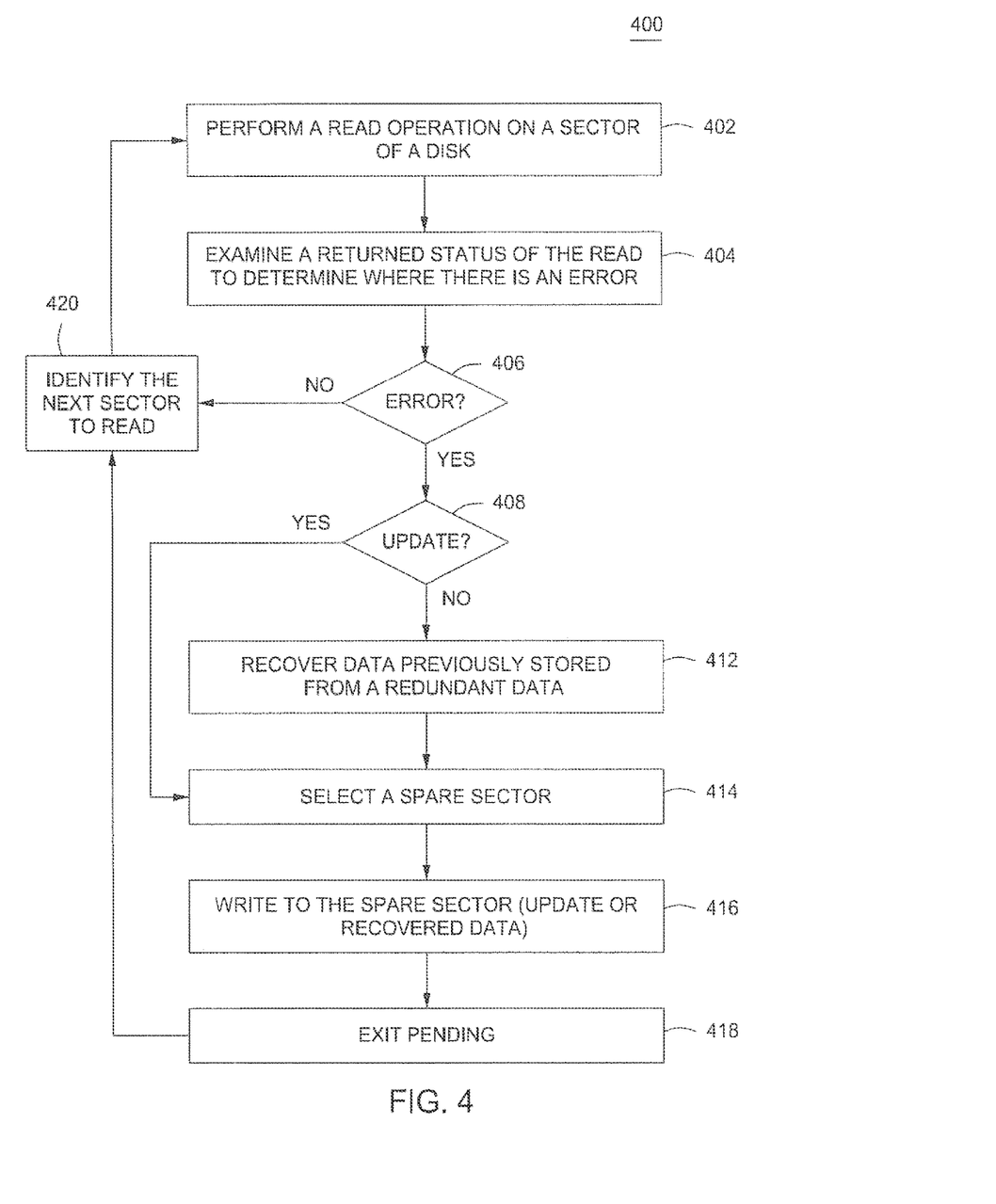
FIG. 4 is a flow chart illustrating an exemplary process for replacing a pending disk sector in accordance with an embodiment of the present disclosure.

Referring to FIG. 4, a flow chart illustrating an exemplary process of replacing a pending disk sector is shown in accordance with an embodiment of the present disclosure. Process 400 can be performed by system 300 of FIG. 3 or any software, hardware modules and the combination thereof. Starting at step 402, process 400 performs a read operation on a sector marked as pending of a disk at a read request from a data client of the storage system. At step 404, a status for the read operation is returned and examined to determine whether an error has occurred with regard to the read operation. Next, in decision block 406, along the NO path indicating that no error has occurred to the read operation, process 400 proceeds to step 420 to identify the next sector of the disk for reading.

Otherwise, along the YES path indicating that an error has occurred during the read operation, process 400 determines whether there is a write operation intended for the sector at step 408. Along the YES path where there happens to be a write operation pending for the sector which incurs the read error, process 400 proceeds to step 414 to select a spare sector, and continues at step 416 to write the update data to the selected spare sector. Afterwards, process 400 proceeds to step 418 to clear the sector of pending status and step 420 to identify the next sector of the disk for reading.

Along the NO path where there has been no write operation pending for the erring sector, process 400 recovers the data previously stored in the erring sector at step 412. As described hereinabove, the data can be recovered from a redundant copy in a variety of ways. Next, at step 414 a spare sector is selected from the disk as a replacement sector, to which the reconstructed content is written at step 416. Afterwards, process 400 proceeds to step 418 to clear the sector of pending status and step 420 to identify the next sector of the disk for reading.

Figure 5:
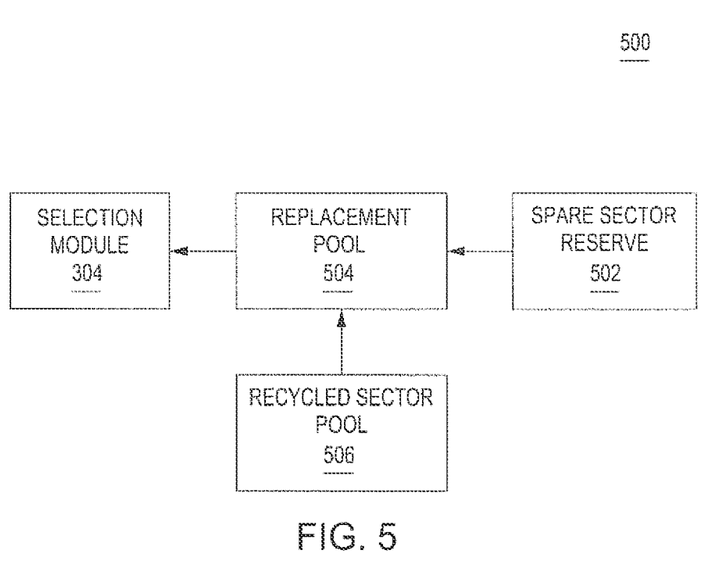
FIG. 5 is a schematic block diagram of an exemplary tiered spare sector management utilized by the process of FIG. 4 in accordance with an embodiment of the present disclosure.

Referring to FIG. 5, a schematic block diagram of an exemplary tiered spare sector management utilized by the pending disk sector replacement mechanism is shown in accordance with an embodiment of the present disclosure. Modern disk systems usually build in a number of spare sectors in reserve which are not initially assigned with LBAs. The multitude of such spare sectors can be in thousands, for example, a 4 TB HDD can equipped with an additional 0.6 TB capacity in reserve even though only 4 TB of its capacity having its PBAs mapped to LBAs in the disk drive. As illustrated in FIG. 5, the spare sector manager 500 can be implemented as a module independent from selection module 304 of FIG. 3, but it can also be implemented as part of selection module 304 or in other suitable forms in the data storage system. Spare sector manager 500 includes spare sector reserve 502 that includes all the spare sectors originally set aside without LBAs in the disk. Spare sector manager 500 further includes a replacement sector pool 504, whose the spare sectors are transferred from spare sector reserve 502 and recycled sector pool 506. Replacement sector pool 504 operates as an intermediary buffer between selection module 304 and both of spare sector reserve 502 and recycled sector pool 506, as selection module is configured to request replacement sector pool to identify and allocate spare sectors.

Recycled sector pool 506 obtains its sectors from those sectors that have been marked as pending and then replaced with spare sectors. In other words, instead of disposing the replaced sectors from future usage due to its unreliable operation history, the data storage system keeps those replaced sector in the form of recycled spare sector in recycled sector pool 506 for potential reuse. The storage system also remove the LBAs associated with the replaced sectors prior to the replacement, and upon reuse, recycled spare sectors are to have new LBAs reassigned to their corresponding PBAs.

Spare sector reserve 502, replacement sector pool 504 and recycled sector pool 560 each maintains a respective count of the number of spare sectors available therein. They also can be represented by use of any suitable data structures (e.g., FIFO, etc.) known in the art.

In some embodiments, spare sectors from reserve 502 and recycled sector pool 506 can be transferred to replacement sector pool 504 in batch. In some other embodiments, the plurality of spare sectors for loading into replacement sector pool 504 can be implemented such that, despite the fact that spare sectors in reserve 502 and recycled sector pool 506 can be randomly disbursing over the disk platters, the replenishing load can be selected in a fashion that the replacing sectors are in near proximity to the pending sector. For example, given a particular pending sector, preferable transfer of spare sectors can be those located at the same platter as the pending sector and within a certain distance from the pending sector. For another example, the storage system can also monitor the history of sector errors, which can happen in bursts, such that to predict the regions of spare sectors as the optimal spare sector candidates to replenish replacement pool 504 with. With the optimized selection of spare sectors into replacement pool 504 for replacing pending sectors, seek time for the newly allocated spare sectors replacing the pending sectors is optimized such that HDD latency can remain the same or with little change, balancing the disk latency with the replacement procedure.

Furthermore, with some other embodiments, the size of replacement sector pool 504 can be configured smaller in relation to the size of the spare sector reserve 502 such that the selection of a spare sector can be performed with optimization as a spare sector is to be selected from a smaller collection of candidate sectors, regardless how the selection process is optimized. Therefore, latency caused by the computation process for optimized selection of spare sectors can be further decreased.

Figure 6:
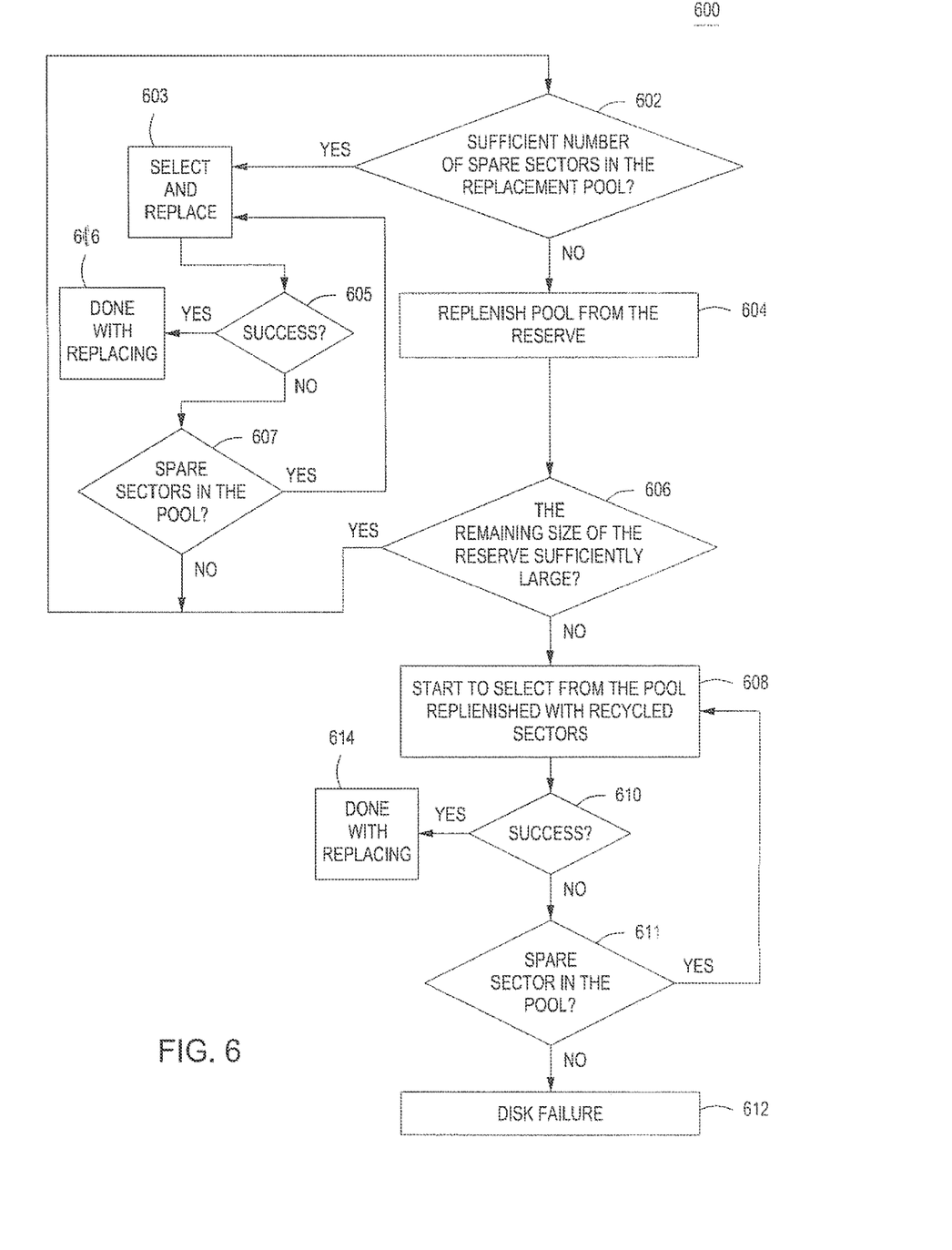
FIG. 6 is a flow chart illustrating an exemplary process for selecting a spare sector for pending disk sector replacement in accordance with an embodiment of the present disclosure.

Referring to FIG. 6, a flow chart of an exemplary process to select a spare sector from the disk drive is shown in accordance with an embodiment of the present disclosure. Process 600 can implement step 414 of FIG. 4. Process 600 starts at step 602, where it is determined whether there are sufficient number of spare sectors in the replacement sector pool 504. The sufficiency extent is a pre-determined threshold and can be adjusted accordingly for configurations of the data storage system. Along the YES path indicating that the number of spare sectors in replacement sector pool 504 exceeds the pre-determined threshold, process 600 selects a spare sector from replacement sector pool 504 and replaces the pending sector in step 603. The replacement sector pool 504 accordingly decrements its spare sector count by one and no longer include the selected sector from the pool.

At step 605, if the selected spare sector successfully replaces the pending sector, along the YES path, method 600 concludes the process of selecting a spare sector for the purpose of correcting the problematic disk sector's pending status at step 616. Along the NO path where the selected spare sector does not successfully replace the pending sector, method 600 determines at step 607 whether to continue to select from replacement pool 504 a spare sector for replacement. Along the NO path where it is determined the replacement pool 504 is not to be depleted any more according to a pre-determined policy, method 600 continues back at step 602 to perform an inventory count of the replacement pool 504. Along the YES path where it is determined replacement pool 504 can still supply spare sectors for replacement according to a pre-determined policy, method 600 continues at step 603 to select a spare sector from replacement pool 504 and tries to replace the pending sector with the selected spare sector.

Upon an unsuccessful replacement of the pending sector with the selected spare sector at step 605, a retry policy can be adopted so that to determine whether continue to select the next spare sector available from replacement sector pool 504 for replacement. In some embodiments, the selection of the next available spare sector can be performed until all the spare sectors in the replacement pool 504 are selected and tried for replacing the pending sector. When all the available spare sectors in replacement pool 504 for successive tries for the replacement are exhausted without being able to successfully replace the pending sector, process 600 continues back at step 602 to determine whether the replacement pool 504 ought to be replenished with spare sectors from reserve 502.

Along the NO path where the replacement pool 504 is not deemed to have sufficient number of spare sectors included therein, process 600 replenishes replacement pool 504 at step 604. In some embodiments, the replenishment can be performed by loading a plurality of spare sectors from spare sector reserve 502 into replacement sector pool 504. The number of spare sectors to be loaded can be pre-determined and can be adjusted accordingly for configurations of the data storage system. Replacement sector pool 504 and reserve 502 both update the counts of their respective spare sectors available in the pools accordingly.

At step 606, process 600 determines whether the spare sector reserve 502 still includes a sufficient number of spare sectors at this point. If so, along the YES path, process 600 continues at step 602 to determine whether there are sufficient number of spare sectors in the replacement pool in order to select a spare sector from replacement pool 504. Otherwise, along the NO path, process 600 initiates a process of selecting a spare sector from replacement pool 504 replenished with recycled sectors transferred from recycled sector pool 506 at step 608.

At step 610, method 600 determines whether the spare sector selected from replacement involving recycled spare sectors successfully replaces the pending sector. Along the YES path, method 600 concludes the process of selecting a spare sector for the purpose of replacing the pending sector at step 614. Along the NO path where the selected spare sector fails to replace the pending sector, method 600 determines at step 611 whether there are still any spare sectors available in replacement pool 504 which can be repeatedly replenished by use of a process to transfer recycled sectors thereinto. Along YES path where there is still a spare sector available in replacement pool 504, method 600 continues at step 608 to select a spare sector and try to replace the pending sector with the selected one. Along NO path where there is no more spare sectors available in replacement pool 504 even with the supplies from recycled sectors, method 600 concludes at step 612 and indicates a failure status as the disk has no spare sectors to correct the pending status of the pending sector.

Figure 7:
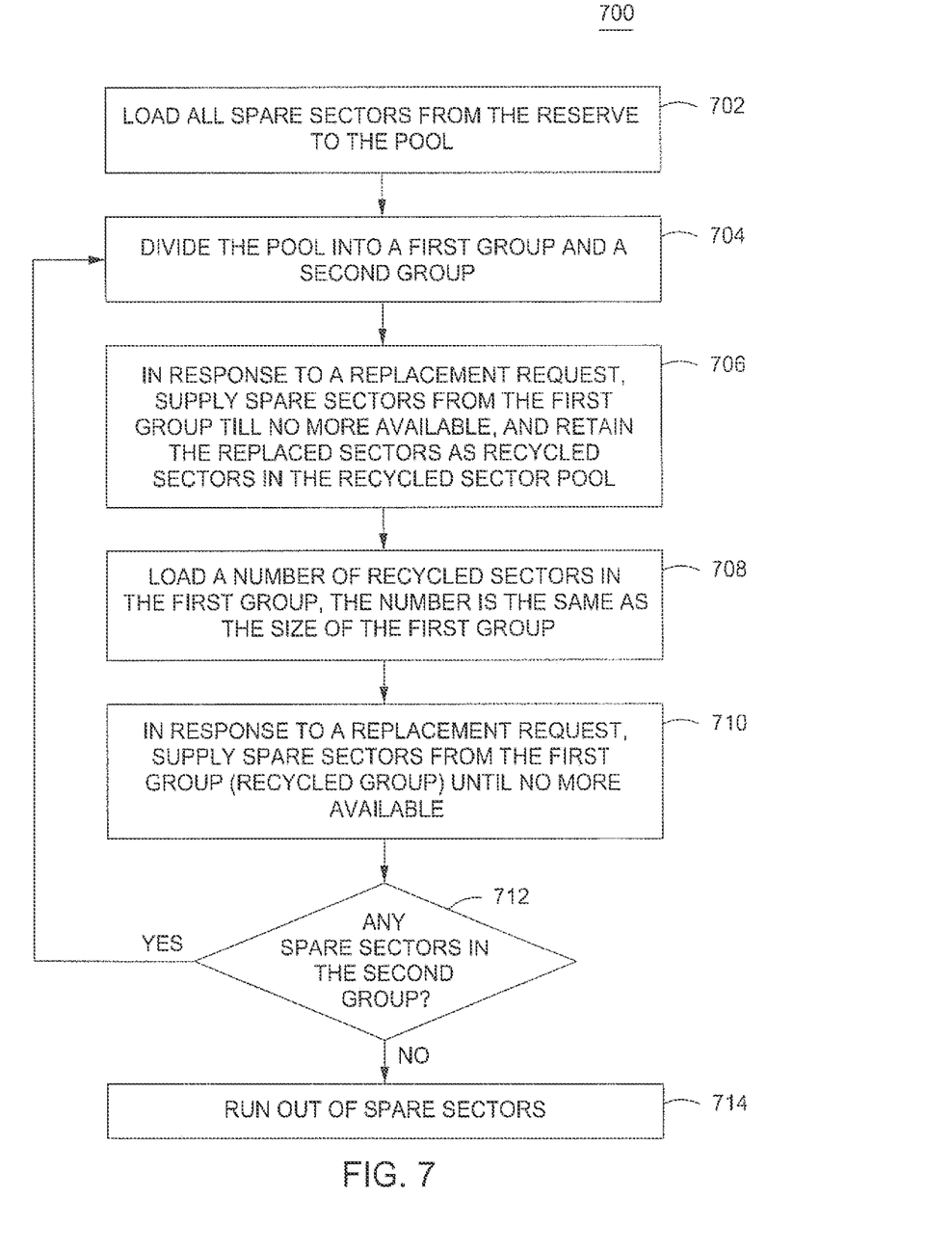
FIG. 7 is a flow chart illustrating another exemplary process for selecting a spare sector for pending disk sector replacement in accordance with an embodiment of the present disclosure.

Referring to FIG. 7, a flow chart of another exemplary process to select a spare sector from a replacement pool replenished with recycled sectors is shown in accordance with an embodiment of the present disclosure. Process 700 can implement step 608 of FIG. 6 in accordance with an embodiment of the present disclosure. At this point, it is determined from process 600 that spare sector reserve 502 no longer has a large amount of spare sectors. In other words, the storage system has re-mapped the spare sectors originally in the spare sector reserve 502 for replacement of pending sectors. Consequently, process 700 in step 702 loads all the remaining spare sectors in spare sector reverse 502 into replacement pool 504, regardless how many are specified as the pre-determined replenishing load. In step 704, all the spare sectors available in replacement pool 504 are divided into two groups, a first-to-deplete group and a second-to-deplete group. In some embodiments, the two groups can be configured to have the same first size, i.e., including the same number of spare sectors. Alternatively, the two groups can be configured to include any number of spares relative to each other for purposes of adjusting the relative speed and reliability in terms of replacing pending disk sector.

Further, at step 706, process 700 supplies a spare sector from the first-to-deplete group in response to a replacement request until there are no longer any spare sectors in the first-to-deplete group. During the meantime, process 700 also retains the then pending sectors and now successfully replaced sectors in recycled sector pool 506.

At step 708, upon the depletion of spare sectors included in the first-to-deplete group, process 700 starts to replenish replacement pool 504 from recycled sector pool 506. In some embodiments, process 700 transfers a number of recycled sectors from pool 506 into the first-to-deplete group, the number being the same as the first size of the first-to-deplete group. At step 710, process 700 then starts to supply spare sectors from the replenished first-to-deplete group in response to replacement requests until there are no longer any recycled sectors in the first-to-deplete group.

At step 712, upon the depletion of recycled sectors included in the recycled group, process 700 determines whether there is any spare sector in the second-to-deplete group, which is always composed of spare sectors originally loaded from spare sector reserve 502. Along the NO path where all the spare sectors in the reserve are exhausted, process 700 concludes by indicating a status of running out of sectors for replacement at step 714.

Along YES path, process 700 continues back at step 704 to divide the available spare sectors into two groups of the first-to-deplete and the second-to-deplete. At this point, all the available spare sectors are the ones included in the second-to-deplete group from the prior division. Again, the first-to-deplete group and the second-to-deplete group can be configured to have a same second size, which is half of the first size. Process 700 repeats until there is no spare sectors available from the second-to-deplete group, which also indicates there is no more spare sectors available in the entire disk.

In consideration of that recycled spare sectors used to have trouble with read operations at least once in the past, recycling such potentially unreliable sectors as original spare sectors which have never incurred any error upon data access thereto, cautions are undertaken in some embodiments of the present disclosure. For example, as the original spare sectors are considered reliable sectors, replacement of a pending sector can be performed utilizing a mapping configuration of a ratio of 1:1. In other words, recovered content of the pending sector will only be written to one spare sector of selection. In contrast, as the recycled spare sectors are considered as potentially vulnerable, replacement of a pending sector is performed utilizing a mapping configuration that is redundant than a ratio of 1:1. For example, recovered content of the pending sector will be written to two recycled spare sectors instead of one. In alternative embodiments, the mapping ration between a pending sector and recycled spare sectors can be any ration that suits the system requirement and can be adjustable accordingly.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of replacing failed sectors in a storage system, the method comprising:
   when a failed sector is detected and a pool of spare sectors has more than a first number of spare sectors, selecting a spare sector from the pool of spare sectors to replace the failed sector;
   when the failed sector is detected and the pool of spare sectors has the same as or less than the first number of spare sectors, loading a second number of spare sectors into the pool of spare sectors from a spare sector reserve;
   after the second number of spare sectors has been loaded into the pool of spare sectors from the spare sector reserve, loading all remaining spare sectors from the spare sector reserve into the pool of spare sectors when the spare sector reserve has the same as or less than a third number of spare sectors;
   after all remaining spare sectors from the spare sector reserve have been loaded into the pool of spare sectors, dividing the spare sectors in the pool of spare sectors into a first group of spare sectors and a second group of spare sectors; and
   selecting a spare sector from the first group of spare sectors to replace the failed sector.

2. The method of claim 1, wherein the failed sector is placed into a pool of recycled sectors, and further comprising:
   when the first group of spare sectors is empty, replenishing the first group of spare sectors with recycled sectors from the pool of recycled sectors until there are no more recycled sectors in the pool of recycled sectors;
   when there are no more recycled sectors in the pool of recycled sectors and the pool of spare sectors, dividing the second group of spare sectors into a first subgroup of spare sectors and a second subgroup of spare sectors; and
   selecting a spare sector from the first subgroup of sectors.

3. A method of accessing data stored in a storage disk of a storage system, the method comprising:
   receiving a read operation to a sector of the storage disk;
   in response to an error returned from the read operation, determining whether the sector is to be replaced;
   in response to determining that the sector is to be replaced, replacing the sector with a spare sector, the spare sector being selected by:
   determining whether a number of spare sectors available in a pool of spare sectors exceeds a pre-determined threshold;
   in response to a determination that the number of spare sectors available exceeds the pre-determined threshold, selecting a spare sector from the pool;
   in response to a determination that the number of spares sectors available does not exceed the pre-determined threshold:
   loading a plurality of spare sectors from a spare sector reserve into the pool of spare sectors;
   determining whether a remaining size of the spare sector reserve exceeds a pre-determined reserve-size threshold;
   in response to a determination that the remaining size of the spare sector reserve exceeds the pre-determined reserve-size threshold, selecting a spare sector from the pool;

in response to a determination that the remaining size of the spare sector reserve does not exceed the pre-determined reserve-size threshold:
(a) loading all spare sectors available in the spare sector reserve into the pool of spare sectors;
(b) dividing the spare sectors in the pool into a first group and a second group;
(c) starting to select a spare sector from the first group until exhausting the first group and to retain replaced sectors as recycled sectors;
(d) if there are no spare sectors in the first group, loading a plurality of the recycled sectors in the pool to replenish the first group and starting to select a spare sector from the first group until there is no recycled sectors in the first group;
(e) determining whether a size of the second group is greater than 1; and
(f) in response to a determination that the size of the second group is greater than 1, repeating from step (b).

4. The method of claim 3, wherein the reconstructed data is written to a plurality of recycled sectors selected from the pool.

5. A method of replacing failed sectors in a storage system, the method comprising:
when a failed storage sector is detected and a pool of spare sectors has the same as or less than a first number of spare sectors, loading a second number of spare sectors into the pool of spare sectors from a spare sector reserve;
after the second number of spare sectors has been loaded into the pool of spare sectors from the spare sector reserve, loading all remaining spare sectors from the spare sector reserve into the pool of spare sectors when the spare sector reserve has less than a third number of spare sectors;
after all remaining spare sectors from the spare sector reserve have been loaded into the pool of spare sectors, dividing the spare sectors in the pool of spare sectors into a first group of spare sectors and a second group of spare sectors; and
selecting a spare sector from the first group of spare sectors to replace the failed sector.

6. The method of claim 5, further comprising:
after the failed sector has been detected, reconstructing data previously stored in the failed sector; and
after the spare sector has been selected, writing the reconstructed data to the spare sector.

7. The method of claim 5, wherein the data previously stored in the failed sector is stored by use of erasure coding and the reconstructed data is generated by erasure decoding.

8. The method of claim 5, wherein the failed sector is placed in a pool of recycled sectors.

9. The method of claim 8, further comprising:
when the first group of spare sectors is empty, replenishing the first group of spare sectors with recycled sectors from the pool of recycled sectors until there are no more recycled sectors in the pool of recycled sectors;
when there are no more recycled sectors in the pool of recycled sectors and the pool of spare sectors, dividing the second group of spare sectors into a first subgroup of spare sectors and a second subgroup of spare sectors; and
selecting a spare sector from the first subgroup of sectors.

10. A method of replacing sectors in a storage disk, the method comprising:
replacing a sector with a spare sector if the sector is determined to be replaced;
reconstructing data previously stored in the sector in response to determining that the sector is to be replaced; and
writing the reconstructed data to the spare sector, the spare sector being selected by:
determining whether a number of spare sectors available in a pool of spare sectors exceeds a pre-determined threshold;
in response to a determination that the number of spare sectors available exceeds the pre-determined threshold, selecting a spare sector from the pool;
in response to a determination that the number of spare sectors available does not exceed the pre-determined threshold:
loading a plurality of spare sectors from a spare sector reserve into the pool of spare sectors;
determining whether a remaining size of the spare sector reserve exceeds a pre-determined reserve-size threshold; and
in response to a determination that the remaining size of the spare sector reserve exceeds the pre-determined reserve-size threshold, selecting a spare sector from the pool;
in response to a determination that the remaining size of the spare sector reserve does not exceed the pre-determined reserve-size threshold:
(a) loading all spare sectors available in the spare sector reserve into the pool of spare sectors;
(b) dividing the spare sectors in the pool into a first group and a second group;
(c) starting to select a spare sector from the first group until exhausting the first group and to retain replaced sectors as recycled sectors;
(d) if there are no spare sectors in the first group, loading a plurality of the recycled sectors in the pool to replenish the first group and starting to select a spare sector from the first group until there is no recycled sectors in the first group;
(e) determining whether a size of the second group is greater than 1; and
(f) in response to a determination that the size of the second group is greater than 1, repeating from step (b).

11. A data storage system comprising:
a processor; and
a non-transitory computer-readable medium coupled to the processor, the non-transitory computer-readable medium having computer-readable instructions stored thereon to be executed when accessed by the processor, the instructions comprising:
when a failed storage sector is detected and a pool of spare sectors has more than a first number of spare sectors, selecting a spare sector from the pool of spare sectors to replace the failed storage sector;
when the failed storage sector is detected and the pool of spare sectors has the same as or less than the first number of spare sectors, loading a second number of spare sectors into the pool of spare sectors from a spare sector reserve;
after the second number of spare sectors has been loaded into the pool of spare sectors from the spare sector reserve, loading all remaining spare sectors from the spare sector reserve into the pool of spare sectors when the spare sector reserve has the same as or less than a third number of spare sectors;
after all remaining spare sectors from the spare sector reserve have been loaded into the pool of spare sectors, dividing the spare sectors in the pool of spare sectors into a first group of spare sectors and a second group of spare sectors; and selecting a spare sector from the first group of spare sectors to replace the failed sector.

12. The system of claim 11, wherein the failed sector is placed in a pool of recycled sectors, and wherein the instructions further comprise:

when the first group of spare sectors is empty, replenishing the first group of spare sectors with recycled sectors from the pool of recycled sectors until there are no more recycled sectors in the pool of recycled sectors;

when there are no more recycled sectors in the pool of recycled sectors and the pool of spare sectors, dividing the second group of spare sectors into a first subgroup of spare sectors and a second subgroup of spare sectors; and selecting a spare sector from the first subgroup of sectors.

13. A data storage system having a storage disk, the system comprising:

a processor; and a non-transitory computer-readable medium operably coupled to the processor, the non-transitory computer-readable medium having computer-readable instructions stored thereon to be executed when accessed by the processor, the instructions comprising:

receiving a read operation to a sector of the storage disk;

in response to an error returned from the read operation, determining whether the sector is to be replaced;

in response to determining that the sector is to be replaced, replacing the sector with a spare sector, the spare sector being selected by:

determining whether a number of spare sectors available in a pool of spare sectors exceeds a pre-determined threshold;

in response to a determination that the number of spare sectors available exceeds the pre-determined threshold, selecting a spare sector from the pool in response to a determination that the number of spare sectors available does not exceed the pre-determined threshold:

loading a plurality of spare sectors from a spare sector reserve into the pool of spare sectors;

determining whether a remaining size of the spare sector reserve exceeds a pre-determined reserve-size threshold;

in response to a determination that the remaining size of the spare sector reserve exceeds the pre-determined reserve size threshold, selecting a spare sector from the pool;

in response to a determination that the remaining size of the spare sector reserve does not exceed the pre-determined reserve-size threshold:

(a) loading all spare sectors available in the spare sector reserve into the pool of spare sectors;

(b) dividing the spare sectors in the pool into a first group and a second group;

(c) starting to select a spare sector from the first group until exhausting the first group and to retain replaced sectors as recycled sectors;

(d) if there are no spare sectors in the first group, loading a plurality of the recycled sectors in the pool to replenish the first group and starting to select a spare sector from the first group until there is no recycled sectors in the first group;

(e) determining whether a size of the second group is greater than 1; and (f) in response to a determination that the size of the second group is greater than 1, repeating from step (b).

14. The system of claim 13, wherein the reconstructed data is written to a plurality of recycled sectors selected from the first group of the pool.

15. A non-transitory computer-readable storage medium having embedded therein program instructions, when executed by one or more processors of a device, causes the device to execute a process for replacing failed sectors in a storage system, the process comprising:

when a failed storage sector is detected and a pool of spare sectors has the same as or less than a first number of spare sectors, loading a second number of spare sectors into the pool of spare sectors from a spare sector reserve;

after the second number of spare sectors has been loaded into the pool of spare sectors from the spare sector reserve, loading all remaining spare sectors from the spare sector reserve into the pool of spare sectors when the spare sector reserve has less than a third number of spare sectors;

after all remaining spare sectors from the spare sector reserve have been loaded into the pool of spare sectors, dividing the spare sectors in the pool of spare sectors into a first group of spare sectors and a second group of spare sectors; and selecting a spare sector from the first group of spare sectors to replace the failed sector.

* * * * *